US006119932A

United States Patent [19]
Maloney et al.

[11] Patent Number: 6,119,932

[45] **Date of Patent: *Sep. 19, 2000**

[54] IDENTIFICATION VERIFICATION APPARATUS AND METHOD

[75] Inventors: Raymond Maloney; Charles Holtz, both of Chicago, Ill.; Conrad Alzona, Kenosha, Wis.

[73] Assignee: Protech Video Security, Inc., South Holland, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/801,882

[22] Filed: Feb. 18, 1997

[51] Int. Cl.[7] .......... G06K 5/00

[52] U.S. Cl. .......... 235/380; 235/375; 235/382; 902/27

[58] Field of Search .......... 235/380, 379, 235/375, 381, 382, 383, 385, 462, 449, 493; 902/25, 27

[56] References Cited

U.S. PATENT DOCUMENTS

| | | | |
|---|---|---|---|
| 2,914,746 | 11/1959 | James | 235/449 |
| 4,341,951 | 7/1982 | Benton | 235/379 |
| 4,712,909 | 12/1987 | Oshikoshi | 355/20 |
| 4,821,118 | 4/1989 | Lafreniere | 358/108 |
| 4,845,636 | 7/1989 | Walker | 235/381 |
| 4,864,108 | 9/1989 | Hamada et al. | 235/379 |
| 4,982,072 | 1/1991 | Takigami . | |
| 4,991,008 | 2/1991 | Nama | 235/379 |
| 4,998,753 | 3/1991 | Wichael . | |
| 5,038,293 | 8/1991 | Goodman | 235/381 |
| 5,095,196 | 3/1992 | Miyata | 235/382 |
| 5,199,081 | 3/1993 | Saito et al. | 235/380 |
| 5,233,658 | 8/1993 | Bianco et al. | 235/449 |
| 5,258,604 | 11/1993 | Behrens et al. | 235/462 |
| 5,268,963 | 12/1993 | Monroe et al. | 380/23 |
| 5,337,361 | 8/1994 | Wang et al. | 235/462 |
| 5,420,924 | 5/1995 | Berson et al. | 235/380 |
| 5,420,937 | 5/1995 | Davis | 382/125 |
| 5,426,285 | 6/1995 | Sherrod | 235/449 |
| 5,432,864 | 7/1995 | Lu et al. . | |
| 5,459,304 | 10/1995 | Eisenmann . | |
| 5,519,260 | 5/1996 | Washington . | |
| 5,550,359 | 8/1996 | Bannett | 235/380 |
| 5,608,387 | 3/1997 | Davies | 340/825.34 |
| 5,642,160 | 6/1997 | Bennett | 235/380 |
| 5,722,526 | 3/1998 | Sharrard | 235/381 |

*Primary Examiner*—Michael G Lee
*Assistant Examiner*—Diane I. Lee
*Attorney, Agent, or Firm*—McDonnell Boehnen Hulbert & Berghoff

[57] ABSTRACT

An identification verification apparatus including a camera for capturing an image of the user and a storage device that stores the captured image. The identification verification apparatus further microprocessor and a data detection device coupled to the microprocessor. The microprocessor has an associated memory structure, and the data detection device is operable to extract data from an identification card presented by the user. The extracted data is stored in the memory structure. The improvement also includes a device for superimposing selected portions of the extracted data upon the captured image of the user. A method of identifying a person presenting an identification card is also provided. The identification method includes the steps of recording an image of the person and retrieving identification information from the identification card. In addition, the method includes the step of superimposing at least a portion of the retrieved identification information on the recorded image. The method further provides for creating a database entry from the retrieved identification information.

10 Claims, 3 Drawing Sheets

IDENTIFICATION VERIFICATION APPARATUS AND METHOD

BACKGROUND OF THE INVENTION

The present invention relates generally to security systems, and more particularly, to security systems that are utilized for identification verification. Such systems are useful in conjunction with the sale of age-restricted products, such as tobacco, alcohol and lottery tickets, and with the limitation of admission to restricted access facilities.

In some parts of the United States, age-restricted products, including tobacco and lottery tickets, are sold from vending machines. These vending machines may provide convenient access to such products for many people who have reached the legal age to purchase the products. Unfortunately, the vending machines themselves are unable to determine the age of a purchaser. That responsibility is typically left to the proprietor of the establishment where the vending machine is located. It would therefore be desirable to have an improved method of vending a product having a minimum purchase age.

Generally, security systems are known that are used to limit access to restricted access facilities. For example, security guards and doormen have been employed to check the identification of persons seeking entrance to buildings, offices, nightclubs, etc. Frequently, the points of admission to such restricted access facilities are also monitored by a security camera. A disadvantage of such systems is that they typically record only a wide angle view of the person seeking admittance.

It is desirable to have a record that the identification of a person seeking admittance was checked. Likewise, it is desirable to have a record that the identification of a person seeking to purchase an age-restricted product was checked. Moreover, it is desirable to have a record of the identification presented as an indication that the identification was actually sufficient. Further, it would be desirable to obtain and record additional information from the person presenting identification.

It would therefore be desirable to have an improved identification verification apparatus and method.

SUMMARY OF THE INVENTION

In accordance with a first aspect of the present invention, an improved identification verification apparatus is provided. The apparatus is of the type that includes a camera for capturing an image of a user and a storage device that stores the captured image. The improvement includes a microprocessor and a data detection device coupled to the microprocessor. The microprocessor has an associated memory structure, and the data detection device is operable to extract data from an identification card presented by the user. The extracted data is stored in the memory structure. The improvement also includes a device for superimposing selected portions of the extracted data upon the captured image of the user.

In accordance with a second aspect of the present invention, a method of identifying a person presenting an identification card is provided. The identification method includes the steps of recording an image of the person and retrieving identification information from the identification card. In addition, the method includes the step of superimposing at least a portion of the retrieved identification information on the recorded image. The method further provides for creating a database entry from the retrieved identification information.

In accordance with a third aspect of the present invention, a method of vending a product having a minimum age limitation is provided. The vending method includes the step of providing a vending machine having a camera positioned to capture an image of a user, a storage device, either on-site or off-site via telephone line, that stores the captured image, a microprocessor having an associated memory structure, and a data detection device coupled to the microprocessor. The data detection device is operable to extract data from an identification card presented by the user. The extracted data is stored in the memory structure. The next steps are capturing and storing an image of the user with the camera and the storage device. In addition, the method includes the steps of extracting data, including date of birth information, from the identification card presented by the user and calculating whether the identification card indicates that the user satisfies the minimum age limitation. The method further provides for determining whether the identification card is valid.

BRIEF DESCRIPTION OF THE DRAWINGS

The arrangement and operation of this invention can be clearly understood by considering the following detailed description of the presently preferred embodiments in conjunction with the accompanying drawings, in which.

SOFTWARE LISTING

Figure 2:
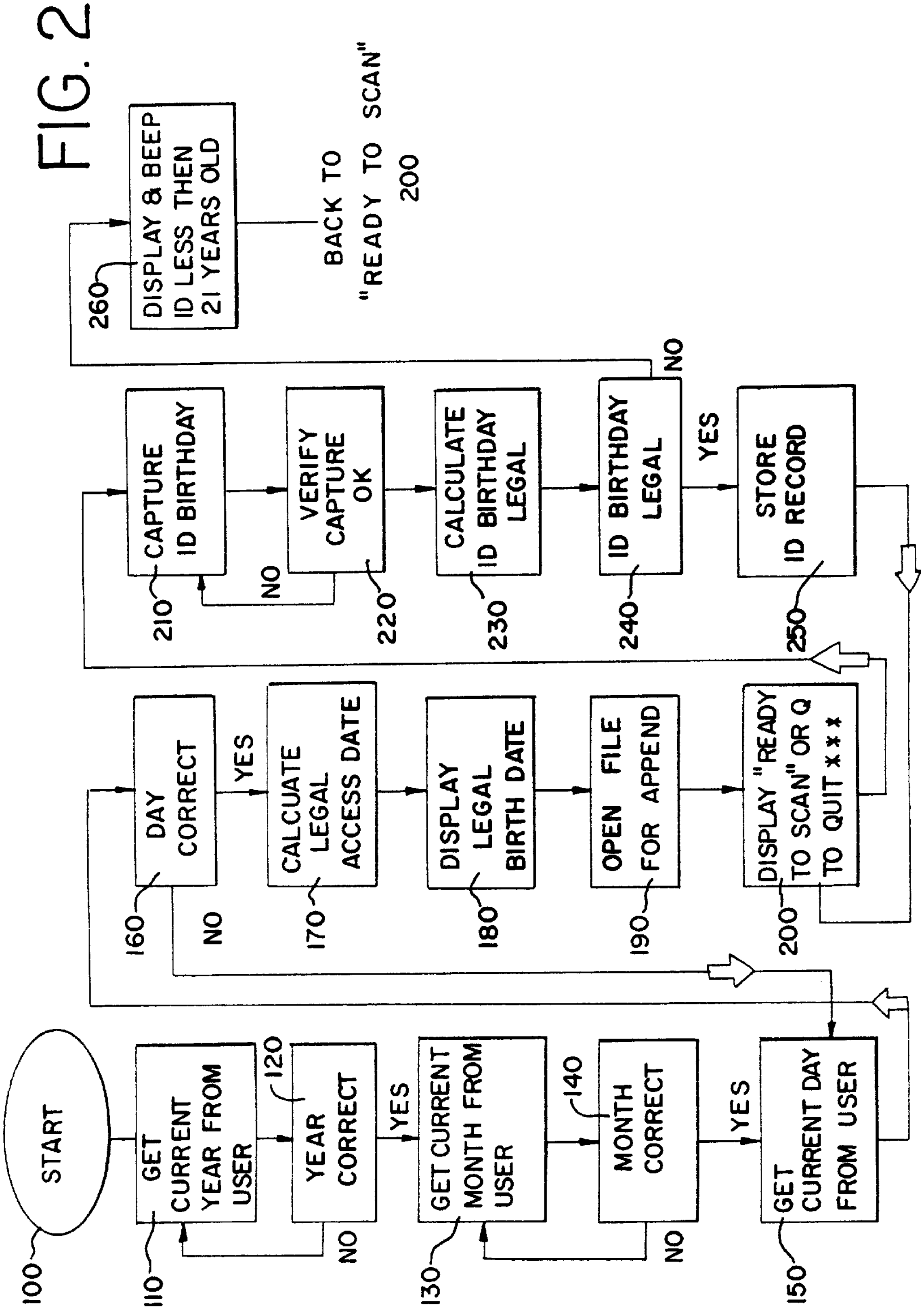
FIG. 2 is a flow chart of the operation of the identification verification apparatus shown in FIGS. 1A and 1B.

Appendix A to the specification includes a software listing corresponding to the steps recited in FIG. 2.

Appendix B to the specification includes a program listing demonstrating how the scanned information, as described with reference to FIG. 2, is formatted and stored.

DETAILED DESCRIPTION OF THE PRESENTLY PREFERRED EMBODIMENTS

Figure 1A:
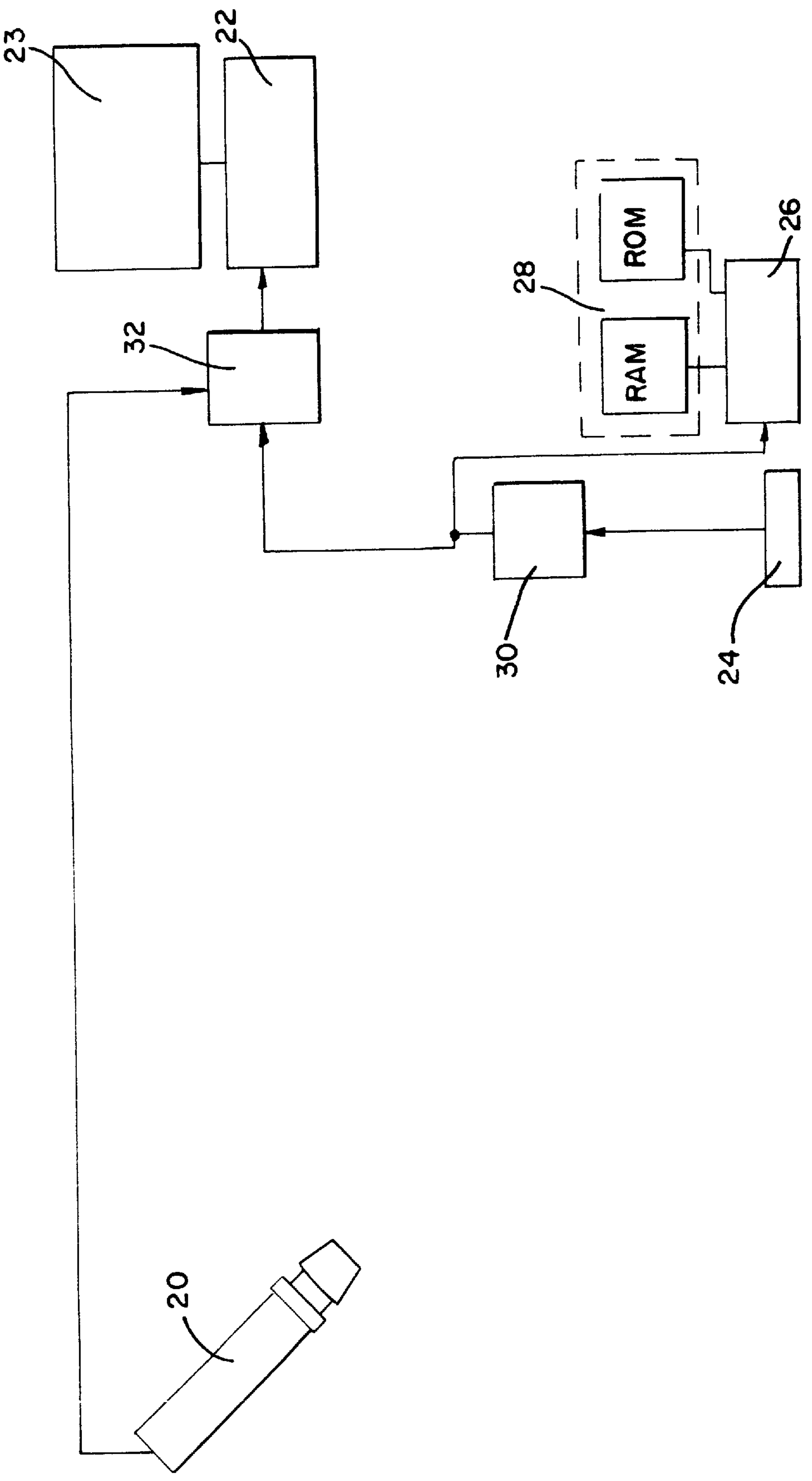
FIGS. 1A and 1B are block diagrams of an identification verification apparatus in accordance with preferred embodiments of the present invention.

The presently preferred embodiments will now be described with reference to Figures, in which like elements are referred to by like numerals. FIG. 1A is a block diagram of an identification verification apparatus in accordance with a preferred embodiment of the present invention. A camera 20 is connected to a storage device 22. A monitor 23 is preferably connected to the storage device 22 to display the input from the camera 20 as it is recorded by the storage device 22.

The storage device 22 is preferably a video tape recorder, such as Sanyo Model No. SRT 500 or SRT 600, but may alternatively be any electronic or magnetic storage medium. The camera 20 may be a CCD low light level camera or any other suitable camera. In addition, the camera 20 is preferably equipped with a wide angle lens. Many suitable cameras and lenses for this application are commercially available. For example, the camera 20 may be a Konica/Chugai Model No. FC62B (Black & White, ⅓", CCD) equipped with a Computar/Chugai 4 MM lens, Model No. TO412FICS. Likewise, numerous commercially available monitors are suitable for this application, such as the Ultrak Model Nos. KM9 and KM12.

The camera 20 is also coupled to a data detection device 24. The data detection device 24 may, for example, be a triple-track magnetic stripe reader, as shown in FIG. 1A. The magnetic stripe reader is coupled through a wedge decoder 30 to a video interface 32. The video interface 32, therefore, receives inputs from the camera 20 and the magnetic stripe reader, through the wedge decoder 30, as shown in FIG. 1A. An output of the video interface 32 is connected to the storage device 22. The wedge decoder 30 is also coupled to a microprocessor 26 having an associated memory structure 28.

A commercially available magnetic stripe reader that is suitable for this application is available from ID Technologies, Inc. of Brea, Calif. as model no. 3830-33. The wedge decoder 30 may be an ID Technologies, Inc. Series 8800-3 Multi-Port Bar Code Reader. The microprocessor 26 and associated memory structure 28 are readily available in the form of a personal computer from a number of manufacturers. For example, a personal computer having an Intel 80486 microprocessor with 4 Megabytes of RAM and a 1 Gigabyte hard disk may be used, or any equivalent thereto. The attached software listing has been written for an IBM-compatible machine. The video interface 32 is preferably a Video Serial Interface: Version 11 (VSI+), which is available from American Video Equipment of Houston, Tex. The identification card may be, for example, a state-issued driver's license with a magnetic stripe.

As alternatives to the magnetic stripe reader, the data detection device 24 may be an optical scanner, such as a bar code reader, a camera with an associated frame grabber, or the like. The optical scanner may be a drop-in replacement for the magnetic stripe reader. If the data detection device 24 is a camera, then the identification verification apparatus is preferably configured as shown in FIG. 1B.

Figure 1B:
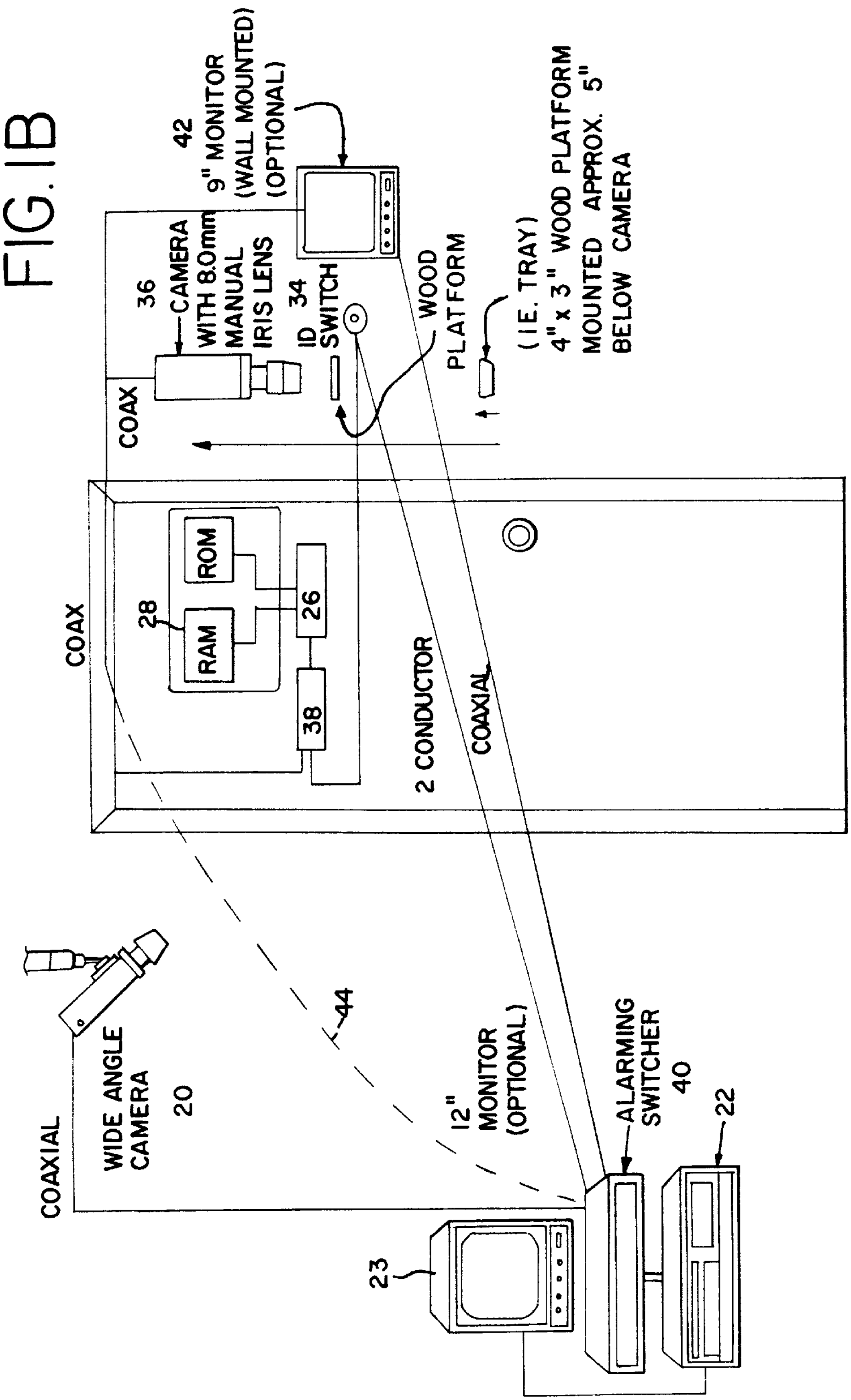

Rather than using a video interface 32 as shown in FIG. 1A, the embodiment shown in FIG. 1B utilizes an ID switch 34 to feed a video signal from the second camera 36 to the storage device 22 when the identification card is placed within the field of view of the second camera 36. Preferably, the speed of the storage device 22 is increased to real time during the interval when the identification card is within the field of view of the second camera 36. The second camera may be a Konica/Chugai Model No. FC62B (Black & White, ⅓", CCD) equipped with a Computar/Chugai TO812FICS lens. A frame grabber 38 is coupled to the second camera 36. The ID switch 34 may be an Alarm/Control Model No. AC-RP45, and the frame grabber 38 may be any one of the number of commercially available frame grabbers, such as a Minolta Snappy Video Still Capture by Play Incorporated of Rancho Cordova, Calif.

The frame grabber 38 generates a digital representation of the identification card from the video signal provided by the camera 36 in a known manner. The microprocessor 26 then applies optical character recognition software, which may be stored in the memory structure 28, to the digital representation of the identification card to thereby recover data contained on the face of the identification card. The frame grabber 38 may alternatively receive a video image from a monitor, such as the monitor 42, coupled to the camera 36.

The monitor 42 alternatively may not be used. In this case, the video feed from the camera 36 may be provided directly to the alarming switcher 40, as indicated by the dashed line 44 in FIG. 1B.

The particular data detection device that is chosen for a particular application may depend upon the types of identification cards that are likely to be presented by the customers or patrons. As a further alternative, the identification verification apparatus may include all three of the particular data detection devices described above, or any combination thereof.

The embodiments described herein may be installed at security checkpoints, including for example at the entrance to a nightclub or other age or otherwise restricted area, at the point of sale, in a vending machine or in similar locations. For point-of-sale and security installations, an operator will typically receive an identification card from a customer or patron and utilize the identification verification embodiments described herein to check the identification card. The operator may be, for example, a cashier, a security guard or a doorman. On the other hand, the embodiments of the identification verification apparatus described herein do not require the presence of an operator. Rather, the embodiments of the identification verification apparatus may be installed so that the customer or visitor presents his or her identification directly to the apparatus of the present invention. The latter arrangement will typically apply, for example, in vending machine installations, but may also be used at point-of-sale and security installations. The embodiments described herein may alternatively be used for identification verification at testing sites, airport check-in, financial institutions, prisons, government offices and the like.

The identification verification apparatus shown in FIGS. 1A and 1B operates as follows when used in conjunction with an operator. When a customer or patron approaches the operator of the apparatus, the camera 20 captures an image of the customer. The image is transferred in electronic form from the camera 20, through the video interface 32, to the storage device 22. Typically, the storage device 22 records the image captured by the camera 20 at a rate that is less than real time in order to reduce the amount of storage required. In addition, the storage device 22 may superimpose time and date information on the recorded image.

The customer then presents an identification card or the like to the operator, who uses the data detection device 24 to read data from the identification card. The data is decoded by the decoder 30 and then transmitted to the microprocessor 26 and the video interface 32. At the microprocessor 26, the data is preferably formatted and stored as a database entry. A monitor (not shown) may be connected to the microprocessor and located within view of the operator to provide the operator with instructions, such as whether the data was properly read from the identification card, or information derived from the data.

In addition, for the embodiment shown in FIG. 1A, the video interface 32 converts at least a portion of the data into video format and adds the video formatted data to the video signal from the camera 20. In this manner, the data may be superimposed upon the image of the customer that is captured by the camera 20 to form a composite image, which is then recorded by the storage device 22.

For the embodiment shown in FIG. 1B, on the other hand, the operator's activation of the ID switch 34 feeds a video signal from the second camera 36 to the storage device 22 when the identification card is placed within the field of view of the second camera 36. An alarming switcher 40 is coupled between the ID switch 34 and the storage device 22. The alarming switcher 40 may also be coupled to a second monitor 42 that is located within the range of view of an operator.

FIG. 2 is a flow chart of the operation of the identification verification apparatus shown in FIGS. 1A and 1B, where an operator is employed to enforce an age limitiation, such as in conjunction with the sale of alcohol, tobacco or lottery tickets. At the starting step 100, the operator begins by calibrating the apparatus. The apparatus is calibrated when the operator enters the current date by entering the year at step 110, the month at step 130 and the day at step 150. After each step 110,130 and 150, the operator is prompted to reply whether the data has been entered correctly (steps 120, 140 and 160). If the operator indicates that the entered information is incorrect, the program returns to the previous step to allow the operator to re-enter the data. Once the data is properly entered, the apparatus calculates, at step 170, and then displays, at step 180, a legal access date. The legal access date is calculated by subtracting a predetermined age limitation, such as twenty-one years for the purchase of alcohol, from the current date as entered by the operator.

At step 190, a file is opened to which data may later be appended. The apparatus is now ready to scan data and, at step 200, a message is provided to the operator indicating that the apparatus is ready. If the operator decides to quit at step 200, the file that was opened at step 190 is closed and the program may return to step 100. Typically, the operator may quit the program at the end of each business day.

Otherwise, the program remains at step 200 until the operator scans an identification card, such as when a customer presents an identification card to gain admission to a bar or nightclub. When the customer presents the identification card, the operator scans the identification card using a data detection device, such as the data detection device 24, shown in FIGS. 1A and 1B.

At step 210, the identification card is scanned and the date of birth, for example, is captured from the identification card. During step 210, the scanned data is read from the identification card and written to the file that was opened at step 190. At step 220, the program determines whether the identification card was properly scanned. If the identification card was not properly scanned, the program returns to step 210 and the operator may be prompted to re-scan the identification card. On the other hand, if the identification card was properly scanned, then the program proceeds to step 230.

At step 230, the date of birth information is located within the scanned data. Then, at step 240, the date of birth information from the identification card is compared to the legal access date calculated at step 170. If the date of birth information indicated that the customer is of an appropriate age, then the program proceeds to step 250, where the scanned information is formatted and stored as a database entry. If the date of birth information indicated that the customer is not of an appropriate age, then the program may optionally proceed to format and store the scanned information in a separate database. A program listing demonstrating how the scanned information is formatted and stored is attached hereto in Appendix B. Preferably, a separate database entry is created for each customer. From step 250, the program returns to step 200 and is ready to scan the next identification card. If, on the other hand, the date of birth information indicates that the customer is not of an appropriate age at step 240, the program proceeds to step 260 where an indicator is provided to the operator. From step 260, the program returns to step 200.

Where the identification card is used to verify a customer's age when purchasing an age-restricted product, the identification card is typically a state-issued driver's license or state-issued identification card. The present invention, however, is not to be limited to use with such identification cards, nor is it to be limited to use in conjunction with the purchase or sale of age-restricted products. For example, the identification verification embodiments described above may be used with employee identification cards, debit and credit cards, smartcards, or the like. In addition, the apparatus may provide security in any type of restricted access environment, or alternatively, be utilized in cash registers, point-of-sale systems or vending machine applications.

The embodiment of the present invention described with reference to FIG. 1A may advantageously provide information regarding the validity of the identification card. For example, where the data detection device 24 is a magnetic stripe reader or an optical scanner, the data detection device 24 retrieves data that is encoded onto the identification card. Counterfeit identification cards may include "dummy" strips, which are cosmetic additions intended to make the counterfeit identification card look genuine. Thus, when the counterfeit identification card is scanned, it may not provide the proper data. In particular, there may be no data encoded on the identification card or the encoded data may not match the information printed on the face of the identification card, indicating that the card may not be valid. For the embodiments of the identification verification apparatus described herein, the microprocessor 26 may be programmed to reject any identification card that is lacking the proper information in the proper format.

In addition, the microprocessor 26 may be programmed to activate an indicator, such as an audible or visual alarm, when the identification card is unscannable or when the identification card indicates that the user does not satisfy, for example, a minimum age limitation. In vending machine applications, such an indicator may provide the advantage of discouraging under-aged or unqualified users. Moreover, the microprocessor 26 may disable the vending machine for a predetermined period if the identification card is not valid and/or the user fails to satisfy the minimum age limitation. One of ordinary skill in the art will be able to program the microprocessor 26 in this manner, using hardware, software or some combination of the two, upon studying this specification.

In any of the applications described above, the preferred embodiments may automatically and continuously generate a database of "users," for example as described above with reference to FIG. 2. In accordance with a preferred embodiment, the database is also updated for repeat users. For example, when an identification card is scanned, the existing database entries are searched for matching identification information. When matching identification information is located, the existing database entry may be updated, for example, to include the current date of use. In this manner, a proprietor may keep track not only of who the users are, but also the frequency of use, regularity of use, etc. The users may typically be customers, patrons, visitors or the like. In terms of security, the database provides backup to the recorded images of the users. In addition, however, the database advantageously provides information in electronic form that is either not available, or not readily available, from the recorded images. For instance, the database may provide a mailing address for each user. Such information may be useful for marketing purposes in particular. Moreover, the embodiments described above may be incorporated into existing camera-based security systems.

It is intended that the foregoing detailed description be regarded as illustrative rather than limiting. Other embodiments, which may embody the principles of the present invention, may be readily devised by those skilled in the art in light of the foregoing. Accordingly, it is to be understood that the identification verification apparatus and method described herein are not limited to the specific illustrations provided, but may assume other embodiments limited only by the scope of the following claims, including all equivalents thereto.

APPENDIX A

```
* Scan ID and write info to a file
* pressing Enter on a blank line ends the program.
*/
#include <string.h>
#include <dos.h>
#include <conio.H>
#include <stdlib.h>
#include <stdio.H>
#define MAXPATH 64
#define MAXLINE 256
int main(void)
{
    FILE *fp;                                  /* file pointer */
    char *pathname = “LSP.TXT”;                /* file name buffer */
    char line[MAXLINE];                        /* line buffer */
    char *currentpl, *endword, *id birthday;   /* current place buffer, endwo
    char line1[MAXLINE];                       7* scanned line1 buffer */
    char line2[MAXLINE];                       /* scanned line2 buffer */
    char line3[MAXLINE];                       /* scanned line3 buffer */
    char legal_yr_21[MAXLINE];                 /* legal year allowed buffer */
    char cur_month[MAXLINE];                   /* current month buffer */
    char legal_month[MAXLINE];                 /* legal month allowed buffer */
    char cur_date[MAXLINE];                    /* current date buffer */
    char legal_date[MAXLINE];                  /* legal date allowed buffer */
    int legal;                                 /* legal */
    int l_parm = 8;                            /* legal year parameter = 8 */
    int num_year;                              /* numericyear buffer */
    int yr1996 = 1996;                         /* yr1996 buffer */
    char *cyr1996 = “1975”;                    /* yr1996-21 years of age = legal year *
    char key;                                  /* keyboard data */
    do
    { clrscr( );                               /* Clear the screen*/
        /* User will key in the current year */
        printf(“\n \n \n \n \n \t \t Enter current year (YYYY)-”);
        scanf(“%d”,&num_year);
        printf(“\n \n \t \t You entered %d Is this correct?”, num_year);
        key = getch( );
      if ((key == ‘y’ || key == ‘Y’) && (num_year > 1970)){
        break; }
      else {
        key = ‘n’;}
    } while ((key == ‘n’) || (key == ‘N’));
    clrscr ( );                                /* Clear the screen*/
    printf(“\n \n \n”);
    printf(“\n \t \t 01-January                  05-May          09-September”);
    printf(“\n \t \t 02-February                 06-June         10-October”);
    printf(“\n \t \t 03-March                    07-July         11-November”);
    printf(“\n \t \t 04-April                    08-August       12-December”);
    printf(“\n \n \n \t \t Enter Month (MM)-”);
    gets(cur_month);
    do
    { clrscr( );                               /* Clear the screen*/
    /* User will enter the current month */
    printf(“\n \n \n”);
    printf(“\n \t \t 01-January                  05-May          09-Septembe
    printf(“\n \t \t 02-February                 06-June         10-October
    printf(“\n \t \t 03-March                    07-July         11-November
    printf(“\n \t \t 04-April                    08-August       12-December
    printf(“\n \n \n \t \t Enter Month (MM)-”);
    gets(cur_month);
    printf(“\n \t \t You entered %s Is this correct?”, cur_month);
    key = getch( );
  if (key == ‘y’ || key == ‘Y’) {
    break; }
  else {
    key = ‘n’; }
} while ((key == ‘n’) || (key == ‘N’));
  do
        { clrscr( );                             /* Clear the screen*/
/* User will enter the current data */
printf(“\n \n \n \n \n \t \t Enter today’s date (DD)-”);
gets(cur_date);
printf(“\n \t \t You entered %s Is this correct?”, cur_date);
key = getch( );
    if (key == ‘y’ || key == ‘Y’)
        break;
} while ((key == ‘n’) || (key ==‘N’));
    /* Determine the Legal access date
    * for entry from the user entered current data
```

APPENDIX A-continued

```
* (Current YYYYMMDD-21 = Legal access date) */
if (num__year == yr1996)
      strcpy(legal__yr__21, cyr1996);
if (num__year == 1997)
      strcpy(legal__yr__21, "1976");
if (num__year == 1998)
      strcpy(legal__yr__21, "1977");
if (num__year == 1999)
      strcpy(legal__yr__21, "1978");
if (num__year == 2000)
      strcpy(legal__yr__21, "1979");
if (num__year == 2001)
      strcpy(legal__yr__21, "1980");
if (num__year == 2002)
      strcpy(legal__yr__21, "1981");
if (num__year == 2003)
      strcpy(legal__yr__21, "1982");
if (num__year == 2004)
      strcpy(legal__yr__21, "1983");
if (num__year == 2005)
      strcpy(legal__yr__21, "1984");
if (num__year == 2006)
      strcpy(legal__yr__21, "1985");
if (num__year == 2007)
      strcpy(legal__yr__21, "1986");
if (num__year == 2008)
      strcpy(legal__yr__21, "1987");
if (num__year == 2009)
      strcpy(legal__yr__21, "1988");
if (num__year == 2010)
      strcpy(legal__yr__21, "1989");
if (num__year == 2011)
      strcpy(legal__yr__21, "1990");
if (num__year == 2012)
      strcpy(legal__yr__21, "1991");
if (num__year == 2013)
      strcpy(legal__yr__21, "1992");
if (num__year == 2014)
      strcpy(legal__yr__21, "1993");
if (num__year == 2015)
      strcpy(legal__yr__21, "1994");
if (num__year == 2016)
      strcpy(legal__yr__21, "1995");
if (num__year == 2017)
      strcpy(legal__yr__21, "1996")
if (num__year == 2018)
      strcpy(legal__yr__21, "1997");
if (num__year == 2019)
      strcpy(legal__yr__21, "1998");
if (num__year == 2020)
      strcpy(legal__yr__21, "1999");
if (num__year == 2021)
      strcpy(legal__yr__21, "2000");
if (num__year == 2022)
      strcpy(legal__yr__21, "2001");
if (num__year == 2023)
      strcpy(legal__yr__21, "2002");
if (num__year == 2024)
      strcpy(legal__yr__21, "2003");
if (num__year == 2025)
      strcpy(legal__yr__21, "2004");
if (num__year == 2026)
      strcpy(legal__yr__21, "2005");
if (num__year == 2027)
      strcpy(legal__yr__21, "2006");
if (num__year == 2028)
      strcpy(legal__yr__21, "2007");
if (num__year == 2029)
      strcpy(legal__yr__21, "2008");
if (num__year == 2030)
      strcpy(legal__yr__21, "2009");
if (num__year == 2031)
      strcpy(legal__yr__21, "2010");
if (num__year == 2032)
      strcpy(legal__yr__21, "2011");
if (num__year == 2033)
      strcpy(legal__yr__21, "2012");
if (num__year == 2034)
      strcpy(legal__yr__21, "2013");
```

APPENDIX A-continued

```
if (num__year == 2035)
        strcpy(legal__yr__21, "2014");
if (num__year == 2036)
        strcpy(legal__yr__21, "2015");
if (num__year == 2037)
        strcpy(legal__yr__21, "2016");
if (num__year == 2038)
        strcpy(legal__yr__21, "2017");
if (num__year == 2039)
        strcpy(legal__yr__21, "2018");
if (num__year == 2040)
        strcpy(legal__yr__21, "2019");
if (num__year == 2041)
        strcpy(legal__yr__21, "2020");
if (num__year == 2042)
        strcpy(legal__yr__21, "2021");
if (num__year == 2043)
        strcpy(legal__yr__21, "2022");
if (num__year == 2044)
        strcpy(legal__yr__21, "2023")
if (num__year == 2045)
        strcpy(legal__yr__21, "2024");
if (num__year == 2046)
        strcpy(legal__yr__21, "2025")
if (num__year == 2047)
        strcpy(legal__yr__21, "2026");
if (num__year == 2048)
        strcpy(legal__yr__21, "2027");
if (num__year == 2049)
        strcpy(legal__yr__21, "2028");
if (num__year == 2050)
        strcpy(legal__yr__21, "2029");
if (num__year == 2051)
        strcpy(legal__yr__21, "2030");
if (num__year == 2052)
        strcpy(legal__yr__21, "2031");
if (num__year == 2053)
        strcpy(legal__yr__21, "2032");
if (num__year == 2054)
        strcpy(legal__yr__21, "2033");
if (num__year == 2055)
        strcpy(legal__yr__21, "2034");
if (num__year == 2056)
        strcpy(legal__yr__21, "2035");
if (num__year == 2057)
        strcpy(legal__yr__21, "2036");
if (num__year == 2058)
        strcpy(legal__yr__21, "2037");
if (num__year == 2059)
        strcpy(legal__yr__21, "2038");
if (num__year == 2060)
        strcpy(legal__yr__21, "2039");
if (num__year == 2061)
        strcpy(legal__yr__21, "2040");
if (num__year == 2062)
        strcpy(legal__yr__21, "2041");
if (num__year == 2063)
        strcpy(legal__yr__21, "2042");
if (num__year == 2064)
        strcpy(legal__yr__21, "2043");
if (num__year == 2065)
        strcpy(legal__yr__21, "2044");
if (num__year == 2066)
        strcpy(legal__yr__21, "2045");
if (num__year == 2067)
        strcpy(legal__yr__21, "2046");
if (num__year == 2068)
        strcpy(legal__yr__21, "2047");
if (num__year == 2069)
        strcpy(legal__yr__21, "2048")
if (num__year == 2100)
        strcpy(legal__yr__21, "2079");
if (num__year == 2101)
        strcpy(legal__yr__21, "2080");
if (num__year == 2102)
        strcpy(legal__yr__21, "2081");
if (num__year == 2103)
        strcpy(legal__yr__21, "2082");
if (num__year == 2104)
```

APPENDIX A-continued

```
        strcpy(legal_yr_21, "2083");
    if (num_year == 2105)
        strcpy(legal_yr_21, "2084") ;
    if (num_year == 1970)
        strcpy(legal_yr_21, "1949");
    /* Create the legal date by attaching the following:
    * Legal Year + current month + current date */
    strcat (legal_yr_21, cur_month);
    strcat (legal_yr_21, cur_date);
    printf("\n legal_yr_21 = %S ", legal_yr_21);
    /* Check if the file exists. If it doesn't exist, create LSP.TXT */
    if ((fp=fopen(pathname, "r"))==NULL)
    { printf("\n\n*** %s Is a new file. ***\n", pathname);
                                                    }
/*
* Open the LSP.TXT file for appending.
*/
fp = fopen(pathname, "a");
/*
* Read scanned lines of text from the ID and write them to
* the specified file. Quit when an empty line is seen.
*/
while (1) {
            strcpy (line, "");
        clrscr( );
        printf("\n\r Ready To Scan:(Type q to quit) ");
        fgets(line1, MAXLINE, stdin);
    if ((line1(0) == 'Q') || (line1 [0] == 'q')) /* Q for quit */
        break;
        clrscr( );
        printf("\n Please press the return key!");
        fgets(line2, MAXLINE, stdin);
        clrscr( );
        printf("\n The ID did was not scanned properly,");
        printf("\n \n please press the return key");
        printf("\n \n and re-scan the ID.");
        fgets(line3, MAXLINE, stdin);
        clrscr( );
        /*
        * Verify if the information was captured,
        * otherwise; ask to have the ID rescanned.
        */
    if (num_year == 2070)
        strcpy(legal_yr_21, "2049");
    if (num_year == 2071)
        strcpy(legal_yr_21, "2050");
    if (num_year == 2072)
        strcpy(legal_yr_21, "2051");
    if (num_year == 2073)
        strcpy(legal_yr_21, "2052");
    if (num_year == 2074)
        strcpy(legal_yr_21, "2053");
    if (num_year == 2075)
        strcpy(legal_yr_21, "2054");
    if (num_year == 2076)
        strcpy(legal_yr_21, "2055");
    if (num_year == 2077)
        strcpy(legal_yr_21, "2056");
    if (num_year == 2078)
        strcpy(legal_yr_21, "2057");
    if (num_year == 2079)
        strcpy(legal_yr_21, "2058");
    if (num_year == 2080)
        strcpy(legal_yr_21, "2059");
    if (num_year == 2081)
        strcpy(legal_yr_21, "2060");
    if (num_year == 2082)
        strcpy(legal_yr_21, "2061");
    if (num_year == 2083)
        strcpy(legal_yr_21, "2062");
    if (num_year == 2084)
        strcpy(legal_yr_21, "2063");
    if (num_year == 2085)
        strcpy(legal_yr_21, "2064");
    if (num_year == 2086)
        strcpy(legal_yr_21, "2065");
    if (num_year == 2087)
        strcpy(legal_yr_21, "2066");
    if (num_year == 2088)
```

APPENDIX A-continued

```
            strcpy(legal_yr_21, "2067");
      if (num_year == 2089)
            strcpy(legal_yr_21, "2068");
      if (num_year == 2090)
            strcpy(legal_yr_21, "2069");
      if (num_year == 2091)
            strcpy(legal_yr_21, "2070");
      if (num_year == 2092)
            strcpy(legal_yr_21, "2071");
      if (num_year == 2093)
            strcpy(legal_yr_21, "2072");
      if (num_year == 2094)
            strcpy(legal_yr_21, "2073");
      if (num_year == 2095)
            strcpy(legal_yr_21, "2074");
      if (num_year == 2096)
            strcpy(legal_yr_21, "2075");
      if (num_year == 2097)
            strcpy(legal_yr_21, "2076");
      if (num_year == 2098)
            strcpy(legal_yr_21, "2077");
      if (num_year == 2099)
            strcpy(legal_yr_21, "2078");
            if ((strlen(line1) > 2) || (strlen(line2) > 2) || (strlen(line3)
               strncat(line, line1, (strlen(line1) - 1));
               strncat(line, line2, (strlen(line2) - 1));
               strcat(line, line3);
               fputs(line, fp); }
            else {
               clrscr( );
               printf("\n The ID did was not scanned properly,");
               printf("\n \n please re-scan the ID.");
               }
            /* This will locate the birthday information from the
            * scanned ID.
            */
            currentpl=line2;
            endword=strchr(currentpl, '=');
            *endword = '\0';
            id_birthday = (char *) malloc(strlen(currentpl) + 1);
                  strcpy (id_birthday, currentpl);
            currentpl = endword + 1;
            free ( (void *) id_birthday);
            endword=strchr(currentpl, '=');
            *endword = '\0';
            id birthday = (char *) malloc(strlen(currentpl) + 1);
                  strcpy (id_birthday, currentpl);
            currentpl=endword + 1;
            free ( (void *) id_birthday);
            id_birthday = (char *) malloc(strlen(currentpl) + 1);
                  strcpy (id_birthday, currentpl);
            currentpl=endword + 1;
            clrscr( );
            printf ("\n \n \n");
            printf ("The ID holder's birthday is %s. \n", id_birthday);
            printf ("\n \n The legal year for access is %S", legal_yr_21);
            legal = 0;
            legal = strncmp(id_birthday, legal_yr_21, l_parm);
            /* Display the message if the ID holder is not yet 21
            * years old.
            */
            if (legal > 0) {
                  printf ("\a \n \a \n \n \a \a");
                  printf ("This person is not 21 years old!");
                  printf ("\a \n \n Please verify with the information on the
                  printf ("\a \a \a \a \a \a \a \a \a \a");
                  }
}
/* Close the file.
*/
fclose(fp);
return(1);
}
```

APPENDIX B

```
close all
run if exist c:\lsp\lsp__txt.ntx del c:\lsp\lsp__txt.ntx
run if exist c:\lsp\lsp__txt.ndx del c:\lsp\lsp__txt.ndx
set unique on
use c: \lsp\lsp__txt
delete all
pack
append from c:\lsp\lsp.txt sdf
replace lic__alp with 'A' for lic__alp = '01'
replace lic__alp with 'B' for lic__alp = '02'
replace lic__alp with 'C' for lic__alp = '03'
replace lic__alp with 'D' for lic__alp = '04'
replace lic__alp with 'E' for lic__alp = '05'
replace lic__alp with 'F' for lic__alp = '06'
replace lic__alp with 'G' for lic__alp = '07'
replace lic__alp with 'H' for lic__alp = '08'
replace lic__alp with 'I' for lic__alp = '09'
replace lic__alp with 'J' for lic__alp = '10'
replace lic__alp with 'K' for lic__alp = '11'
replace lic__alp with 'L' for lic__alp = '12'
replace lic__alp with 'M' for lic__alp = '13'
replace lic__alp with 'N' for lic__alp = '14'
replace lic__alp with 'O' for lic__alp = '15'
replace lic__alp with 'P' for lic__alp = '16'
replace lic__alp with 'Q' for lic__alp = '17'
replace lic__alp with 'R' for lic__alp = '18'
replace lic__alp with 'S' for lic__alp = '19'
replace lic__alp with 'T' for lic__alp = '20'
replace lic__alp with 'U' for lic__alp = '21'
replace lic__alp with 'V' for lic__alp = '22'
replace lic__alp with 'W' for lic__alp = '23'
replace lic__alp with 'X' for lic__alp = '24'
replace lic__alp with 'Y' for lic__alp = '25'
replace lic__alp with 'Z' for lic__alp = '26'
delete for filler__2 < >'
pack
append from c:\lsp\lsp
index on lic__alp + lic to lsp__txt
close all
run if exist c:\lsp\lsp.dbf del c:\lsp\lsp.dbf
use c:\lsp\lsp__txt index lsp__txt
copy to c:\lsp\lsp.dbf
close all
```

We claim:

1. An improved identification verification apparatus that includes a camera for capturing images of a plurality of users and a storage device that stores the captured images, the improvement comprising:

a microprocessor having a associated memory structure;

a data detection device coupled through a decoder to the microprocessor, the data detection device being operable to extract data from identification cards presented by the plurality of users, said extracted data including a date of birth and being stored in the memory structure associated with the microprocessor, wherein said microprocessor automatically and continuously generates, in a database, a plurality of database entries corresponding to said extracted data from said identification cards, the microprocessor further updating said database entries when said extracted data is associated with a repeat user; and a video interface coupled to receive inputs from the decoder and the camera and to provide an output to the storage device, wherein the video interface converts the date of birth into a video format and adds the date of birth, in the video format, to the input from the camera, thereby superiming the date of birth upon the captured image of the user.

2. An improved identification verification apparatus as claimed in claim 1, wherein said extracted data comprises a date of birth of the user.

3. An improved identification verification apparatus as claimed in claim 1, wherein said extracted data is stored in the memory structure in the form of a database entry.

4. An improved identification verification apparatus as claimed in claim 1, wherein said data detection device comprises a second camera that produces an image of the identification card, and a frame grabber coupled to said second camera.

5. An improved identification verification apparatus as claimed in claim 4, wherein said microprocessor applies optical character recognition to said image of the identification card.

6. An improved identification verification apparatus as claimed in claim 1, wherein said identification card includes data encoded in a bar code and said data detection device comprises a bar code scanner that is coupled to said microprocessor.

7. An improved identification verification apparatus as claimed in claim 1, wherein said identification card includes data encoded in a magnetic stripe and said data detection device comprises a triple-track magnetic stripe reader coupled to said microprocessor.

8. An improved identification verification apparatus as claimed in claim 1, further comprising a video monitor coupled to the camera.

9. An improved identification verification apparatus as claimed in claim 1, wherein the identification verification apparatus is installed at a point of sale location.

10. An improved identification verification apparatus as claimed in claim 1, wherein the microprocessor disables a point-of-sale device when the extracted date of birth fails to satisfy a minimum age limitation.

* * * * *